(12) United States Patent
Hunter et al.

(10) Patent No.: US 7,261,056 B2
(45) Date of Patent: Aug. 28, 2007

(54) BIRDFEEDER AND SEED DISPENSER THEREFOR

(75) Inventors: Lynn Hunter, Parker, CO (US); James Carter, Denver, CO (US); Furman O'Dell, Evergreen, CO (US); Brian K. Krueger, Denver, CO (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/907,526

(22) Filed: Apr. 4, 2005

(65) Prior Publication Data

US 2006/0112892 A1 Jun. 1, 2006

Related U.S. Application Data

(63) Continuation-in-part of application No. PCT/US04/41773, filed on Dec. 13, 2004.

(60) Provisional application No. 60/529,342, filed on Dec. 12, 2003.

(51) Int. Cl.
*A01K 39/01* (2006.01)
(52) U.S. Cl. ..................... 119/57.8; 119/52.2
(58) Field of Classification Search .............. 119/57.8, 119/52.2, 57.9, 51.01, 52.1, 52.4, 61; D30/124
See application file for complete search history.

(56) References Cited

U.S. PATENT DOCUMENTS

| 4,259,927 A | * | 4/1981 | Clarke | 119/57.9 |
|---|---|---|---|---|
| 5,215,039 A | * | 6/1993 | Bescherer | 119/57.8 |
| 6,378,458 B1 | * | 4/2002 | Boyd | 119/52.3 |
| 6,408,788 B1 | * | 6/2002 | Lieb et al. | 119/52.2 |
| 6,863,024 B1 | * | 3/2005 | Obenshain | 119/57.8 |
| 7,032,539 B1 | * | 4/2006 | Obenshain | 119/52.2 |
| 7,093,561 B2 | * | 8/2006 | Rich et al. | 119/57.8 |
| 7,093,563 B1 | * | 8/2006 | Reynolds | 119/428 |
| D535,445 S | * | 1/2007 | Obenshain | D30/121 |
| 2006/0112892 A1 | * | 6/2006 | Hunter et al. | 119/57.8 |

* cited by examiner

*Primary Examiner*—Yvonne R. Abbott
(74) *Attorney, Agent, or Firm*—Jacobson Holman PLLC

(57) ABSTRACT

A birdseed dispenser and birdfeeder incorporating the same are provided. The dispenser has a base assembly mounted to a first opening formed in the sidewall of the birdseed reservoir, including a front plate having a second opening formed therein, a flange extending around the second opening and projecting away from the front plate, and an end wall supported by the flange such that the flange and end wall together define a chamber. The dispenser also includes an apertured piece received in the chamber having a first seed aperture of a first configuration and a second seed aperture of a different configuration. The apertured piece is moveable between a first orientation, which places the first seed aperture in a seed accessible state permitting birds access to the seed, and a second orientation to place the second seed aperture in the seed accessible state.

35 Claims, 12 Drawing Sheets

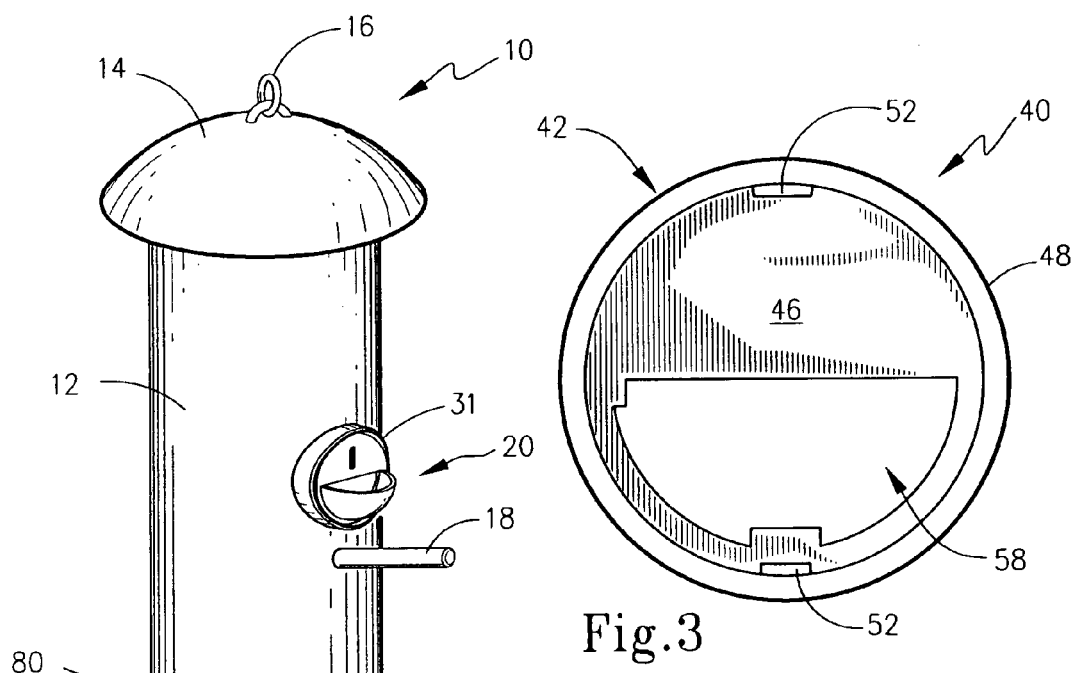
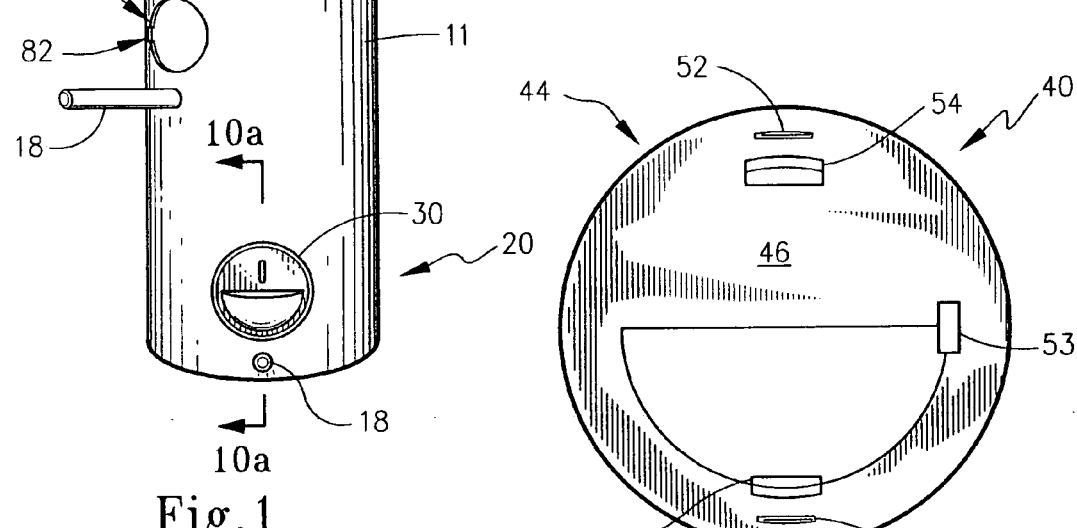
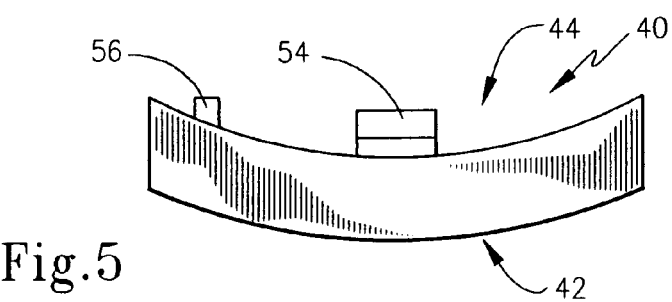
Fig.1 Fig.3 Fig.4 Fig.5

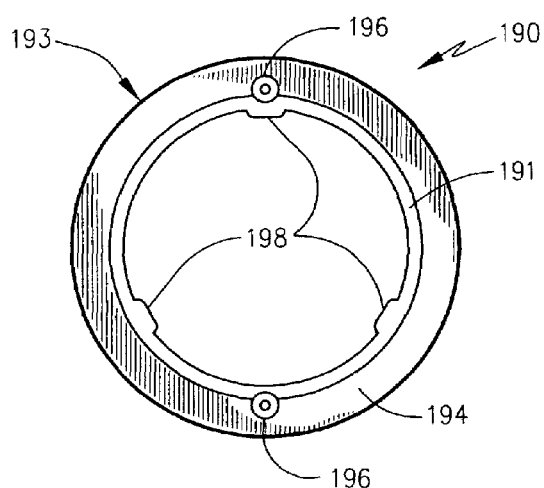
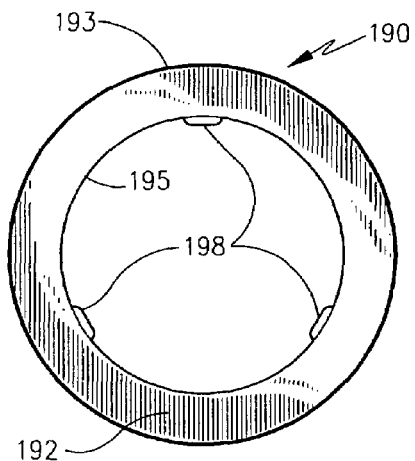
Fig.16  Fig.17
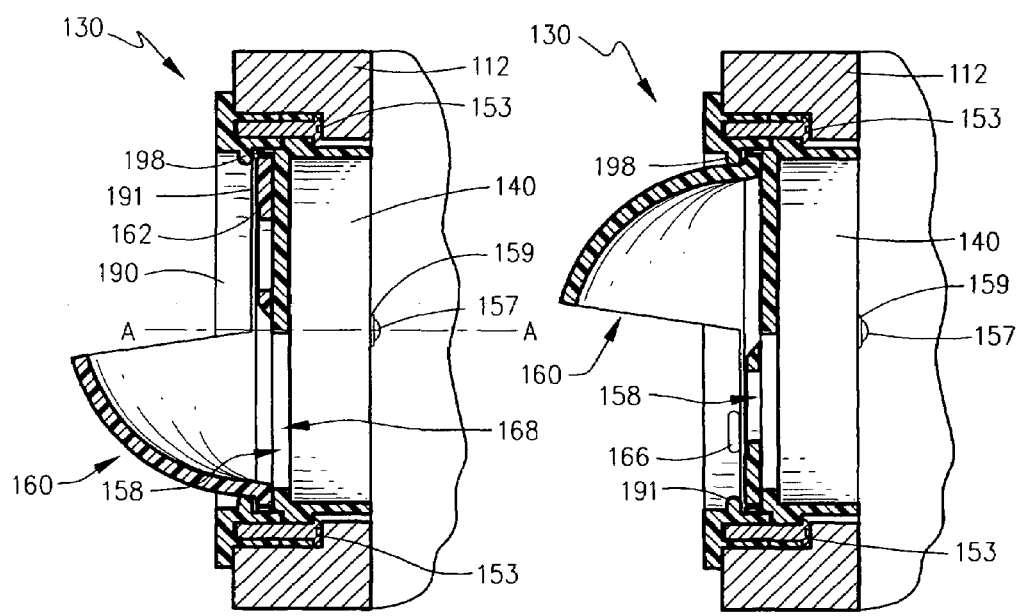
Fig.18a  Fig.18b

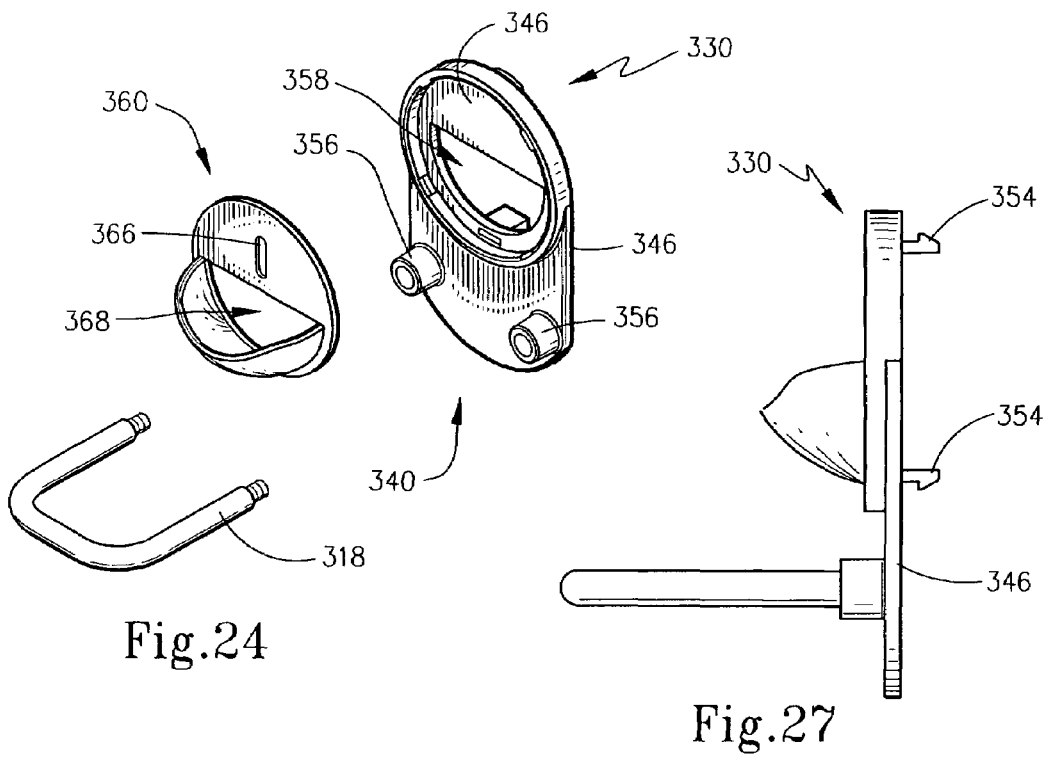
Fig.24
Fig.27
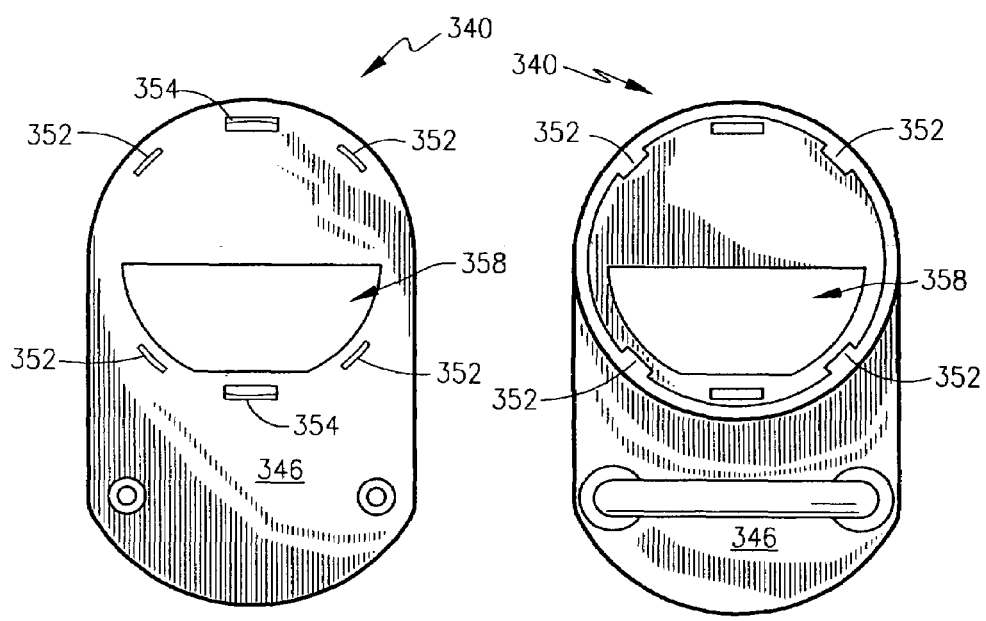
Fig.25  Fig.26

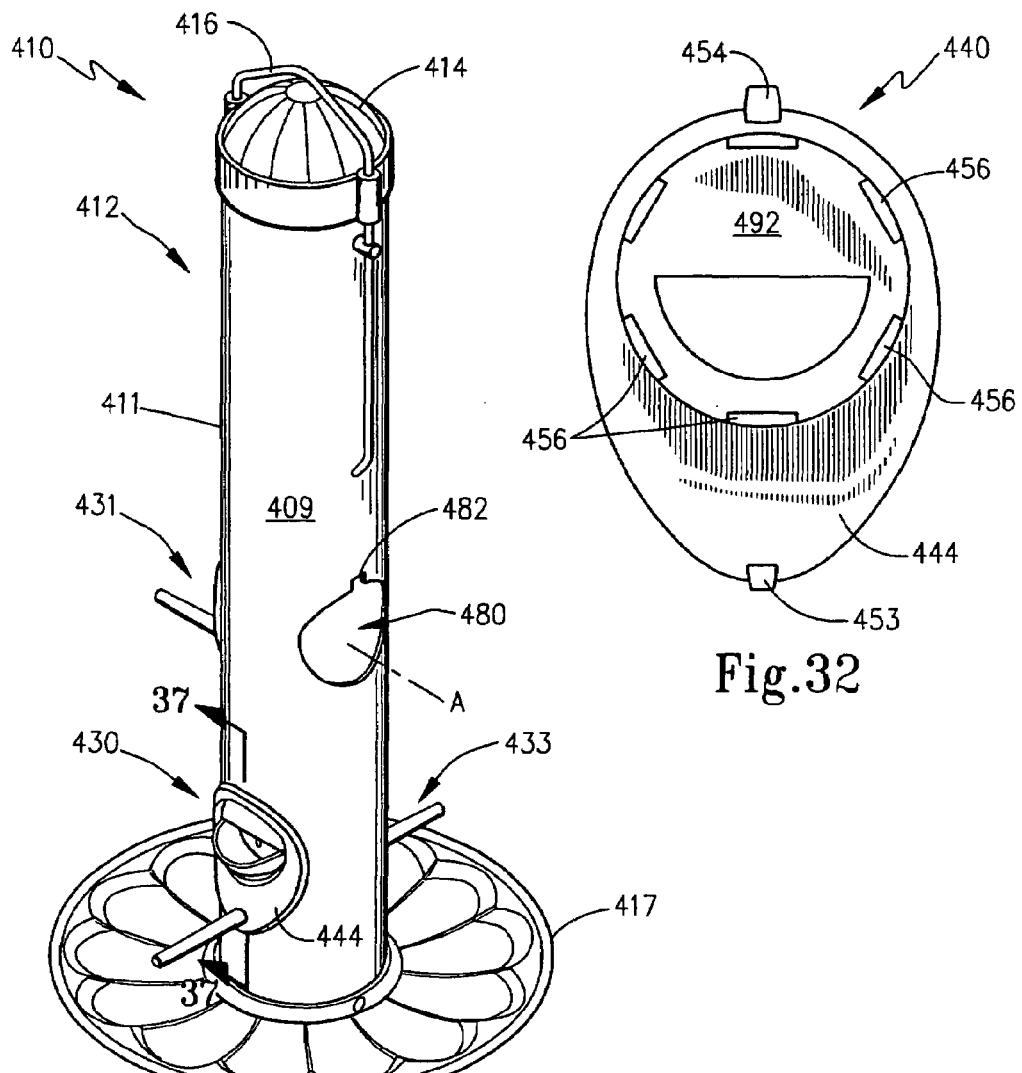
Fig.28
Fig.32
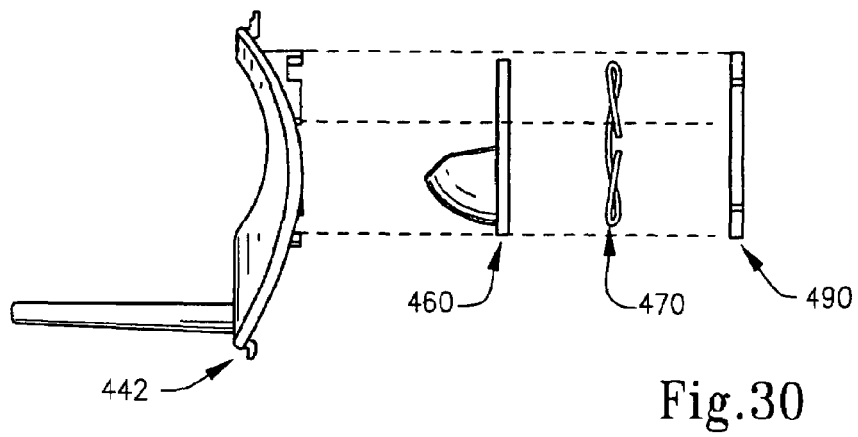
Fig.30

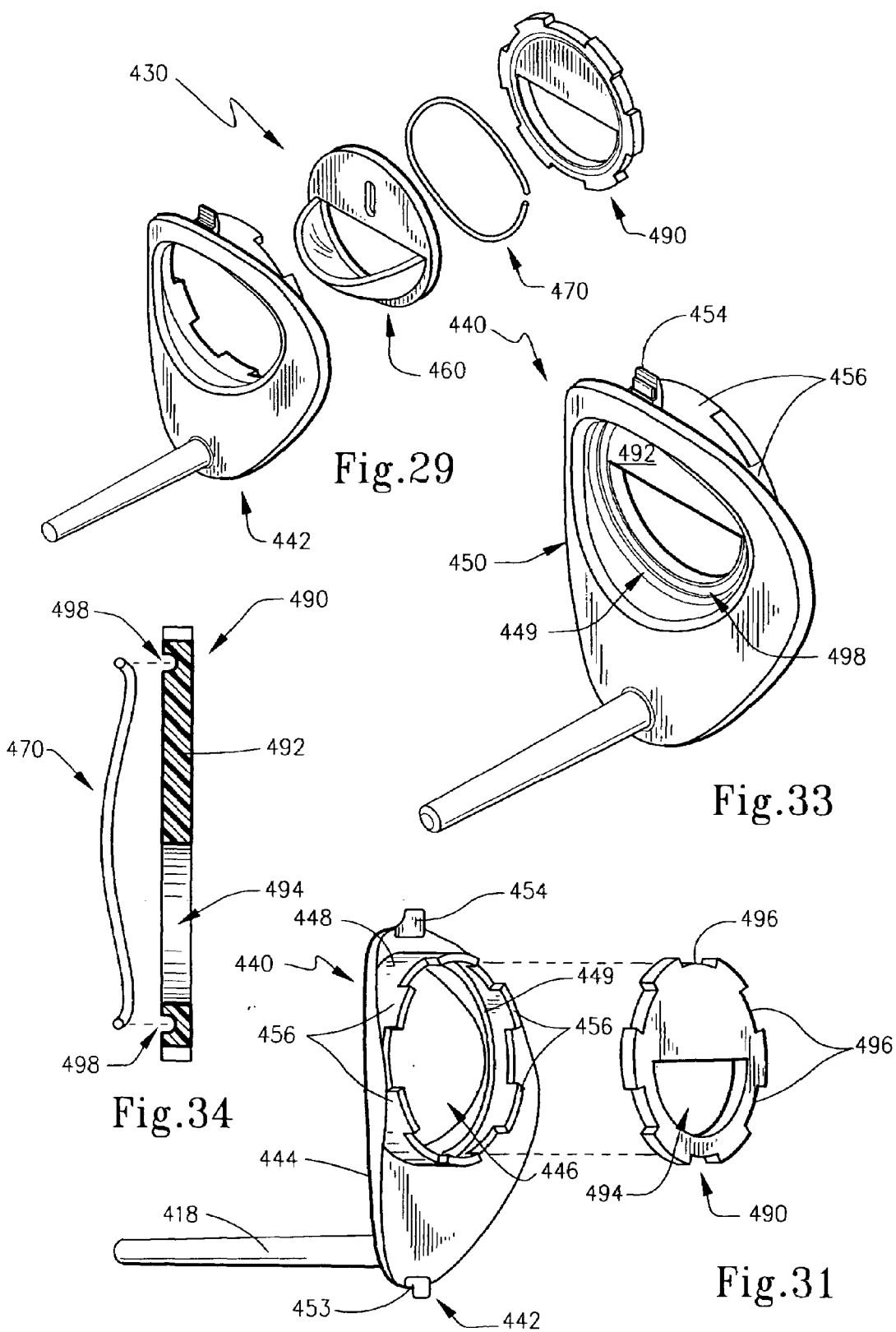

BIRDFEEDER AND SEED DISPENSER THEREFOR

FIELD OF THE INVENTION

The present invention generally relates to birdfeeders for attracting and feeding wild birds. More particularly, the present invention concerns a dispenser with multiple ports for dispensing selective types of birdseed, thereby to attract different species of wild birds. Additionally, the present invention is directed to a birdfeeder incorporating a seed dispenser having multiple ports for dispensing different types of birdseed.

BACKGROUND OF THE INVENTION

Bird watching is a highly prevalent past time in both urban and rural areas. The world is full of birds of numerous varieties in an astounding array of colors and designs. Many people enjoy viewing birds of various types, and an industry has evolved around products directed to improving the ability of persons to closely observe birds in their natural environment. On one hand, many people venture into the outdoors, where binoculars and spotting scopes may be utilized to better view various birds in their natural habitats. Such an approach requires a certain degree of skill, however, in finding and spotting various species of birds. Another approach utilizes various means of attracting birds to one's residence or a desired viewing location, such as adjacent a home's porch or window, where birds may be viewed at one's leisure.

For example, persons have used birdfeeders, birdbaths, and the like to attract birds of various types to their homes. Different types of feeders have been developed, which each dispense foodstuffs that are preferred by a selected variety of bird which a person might desire to view. For example, seeds, grains, suets, and nectars are common foodstuffs that can be dispensed by a selected type of feeder.

Seed dispensing birdfeeders are perhaps the easiest and most popular way of attracting a myriad of wild birds to a particular location for viewing. This is especially so in the winter months when food is scarce. Typically, seed feeders are suspended from a pole or hung from a tree branch so as to elevate the feeder above the ground and are built to hold and protect the seed from the elements.

There are a variety of seed feeders that have been constructed to attract various species of wild birds. In general, such feeders fall into three categories: tray feeders, hopper feeders, and tube feeders. Tray feeders are rather simplistic in design and generally comprise a tray or platform on which birdseed is spread. Hopper feeders further include a feed reservoir, which is oftentimes shaped like a house. The seed is dispensed beneath the reservoir onto a tray or platform that is accessible by the birds. Tube feeders, on the other hand, are hollow, cylindrical tubes, often made of plastic, and have multiple feeding stations spaced along the length of the tube. Typically, feeding stations include both a seed port and an adjacent perch to provide the feeding bird with a place to alight.

Tube feeders are a very popular birdfeeder construction due, in part, to their ability to keep the seed fairly dry and attract various bird species. Particularly, though, the size of the seed ports largely dictate the type of birdseed that may be used to fill the tube feeder and, thus, the types of bird species that will be attracted to the feeder. For example, if the seed ports are relatively large, the feeder can be filled with mixed birdseed or sunflower seeds, which will generally attract larger birds, such as blue jays, cardinals, and grackles. Smaller seed ports, on the other hand, dispense thistle seed, which is a different type of birdseed and is attractive to finches. Accordingly, some tube feeders are specially constructed as thistle feeders with extra small ports for dispensing thistle seeds.

Oftentimes, people prefer to attract several different species of birds to a desired viewing location. Accordingly, it is not uncommon for people to own a variety of birdfeeders for dispensing different types of birdseed. To accommodate this desire, there are a variety of tube feeders available, which vary in size, appearance, and of course, seed port size.

However, for many, space may be limited for hanging birdfeeders, especially for individuals living in apartments with very limited balcony space. For others, time and money may simply limit one's ability to acquire and maintain several different birdfeeders. As a result, many are perhaps limited to owning only one type of birdfeeder that is only capable of dispensing one type of birdseed. Accordingly, there remains a need to provide a seed dispensers that are capable of dispensing different types of seed. Further, there is a need to provide new and improved birdfeeders that are capable of dispensing different types of birdseed. The present invention is directed to meeting these needs.

SUMMARY OF THE INVENTION

An object of the present invention is to provide a new and useful birdfeeder for attracting different species of wild birds.

Another object of the present invention is to provide a selectively versatile birdfeeder that is capable of dispensing different types of birdseed.

Yet another object of the present invention is to provide an improved birdfeeder that is capable of dispensing thistle birdseed, mixed birdseed, or sunflower seeds.

A still further object of the present invention is to provide a tube feeder with multiple feeding stations, which incorporate rotatable seed dispensers.

Another object of the present invention is to provide a seed dispenser with multiple seed ports.

Yet another object of the present invention is to provide a seed dispenser that is capable of dispensing at least two different types of birdseed.

According to the present invention, then, a dispenser is provided that is adapted to access and dispense birdseed from a birdfeeder that has a reservoir with a sidewall having an outer surface and an inner surface. The sidewall includes an opening in the form of a mounting hole to which the dispenser is attached or otherwise mounted. The opening has a central axis that is generally perpendicular to the sidewall.

The dispenser may include a base assembly that is mounted to the birdseed reservoir and an apertured piece supported thereby. The base assembly includes a front plate having an opening formed therein, a flange extending around the opening in the sidewall of the birdseed reservoir and projecting away from the front plate, and an end wall supported by the flange and having an access opening formed therethrough. Together, the flange and the end wall define a chamber wherein the apertured piece is received.

The base assembly may be comprised of two separate components, a base piece and an end piece coupled thereto. The base piece may include a flange having a plurality of spaced apart tab members associated therewith adapted to mate in a snap-fit engagement with a plurality of spaced apart tab slots associated with the end piece. The end piece includes an end wall having an access opening formed therethrough. When assembled, the apertured piece is supported by the base piece at a location proximate to the end wall of the end piece. The base piece may further include a perch and a plurality of prongs for mounting in the opening of the sidewall. The front plate, prongs, perch and flange may be formed as an integral part of the base piece.

The apertured piece is supported by the base piece and is disposed in the chamber at a location proximate to the end wall. As such, the base piece may include a plurality of spaced apart retaining tabs that can retain the apertured piece and permit movement thereof relative to the base piece. The aperture piece includes a first seed aperture of a first configuration and second seed aperture of a second configuration that is different from the first. The first configuration is adapted to dispense thistle birdseed from the reservoir while the second configuration is adapted to dispense mixed birdseed from the reservoir. It is moveable relative to the base piece between a first orientation and a second orientation. In the first orientation the first seed aperture is oriented in a seed accessible state so as to provide access to the birdseed. Meanwhile, the second orientation places the second seed aperture in a seed accessible state. When in the first orientation, the first seed aperture is in fluid communication with the access opening associated with the end piece, while access to the birdseed via the second seed aperture is obstructed by the end wall. In a second orientation, the access opening is in fluid communication with the second seed aperture while access to the birdseed via the first seed aperture is obstructed by the end wall.

As contemplated by the present invention, the apertured piece may be in the form of an apertured dial that is journaled for rotation on the central axis of the opening in the sidewall of the reservoir and rotatably disposed in the chamber. The apertured dial may be rotated relative to the sidewall, or the base piece.

Additionally, the seed dispenser may include a spacer interposed between the apertured piece and the end piece. And adapted to separate at least a portion of the apertured piece from the end wall. The spacer may be in the form of an undulated wire. The end wall may be provided with a circumferential groove formed therein to that is sized and adapted to receive at least a portion of the wire spacer thereby to retain the wire in place.

The present invention also provides for a birdfeeder that is adapted to be supported in spaced relation to a support surface so as to provide birdseed to birds. The birdfeeder includes a birdseed reservoir with a surrounding sidewall and at least one seed dispenser mounted in the opening of the sidewall and adapted to dispense birdseed to the birds as described above. Further, the birdfeeder may be provided with a plurality of openings that are formed in the sidewall such that a plurality of seed dispensers are mounted thereto.

These and other objects of the present invention will become more readily appreciated and understood from a consideration of the following detailed description of the exemplary embodiments of the present invention when taken together with the accompanying drawings, in which:

BRIEF DESCRIPTION OF THE FIGURES

FIG. 1 is a front perspective view of a new and useful birdfeeder according to the present invention, which incorporates a plurality of new and useful seed dispensers, also according to the present invention according to the present invention;

FIG. 3 is a front view in elevation of the base piece of the seed dispenser shown in FIG. 2;

FIG. 4 is a rear view in elevation of the base piece of FIG. 3;

FIG. 5 is a top view in elevation of the base piece of FIG. 3;

FIG. 16 is a rear view in elevation of the retaining ring shown in FIGS. 11 and 12;

FIG. 17 is a front view in elevation of the retaining ring shown in FIGS. 11 and 12;

FIG. 18(a) is a cross-sectional view of a representative seed dispenser shown in FIG. 12 taken about lines 18(a)-18(a) showing the second seed aperture in the seed access state;

FIG. 18(b) is a cross-sectional view of the seed dispenser shown in FIG. 12 taken about lines 18(a)-18(a) showing the first seed aperture in the seed access state;

FIG. 24 is an exploded perspective view of a representative one of the seed dispensers shown in FIGS. 22 and 23

FIG. 25 is a rear view in elevation of the base piece shown in FIG. 24;

FIG. 26 is a front view in elevation of the base piece shown in FIG. 24;

FIG. 27 is a side view in elevation of the seed dispenser shown in FIG. 24;

FIG. 28 is a perspective view of another birdfeeder according to the present invention, which incorporates a plurality of seed dispensers according to a fourth exemplary embodiment of the present invention;

FIG. 29 is an exploded perspective view of a representative one of the seed dispensers shown in FIG. 28;

FIG. 30 is an exploded side view in elevation of the seed dispenser shown in FIG. 29;

FIG. 31 is an exploded back perspective view of the base assembly formed by base piece and the end piece of the seed dispenser shown in FIGS. 29 and 30;

FIG. 32 is a back view in elevation of the base assembly shown in FIG. 31, wherein the base piece and end piece are coupled;

FIG. 33 is a perspective view of the base assembly shown in FIG. 32;

FIG. 34 is a cross-sectional exploded view of the spacer and end piece, which are components of the seed dispenser shown in FIGS. 29 and 30;

DETAILED DESCRIPTION OF THE EXEMPLARY EMBODIMENTS

Figure 2:
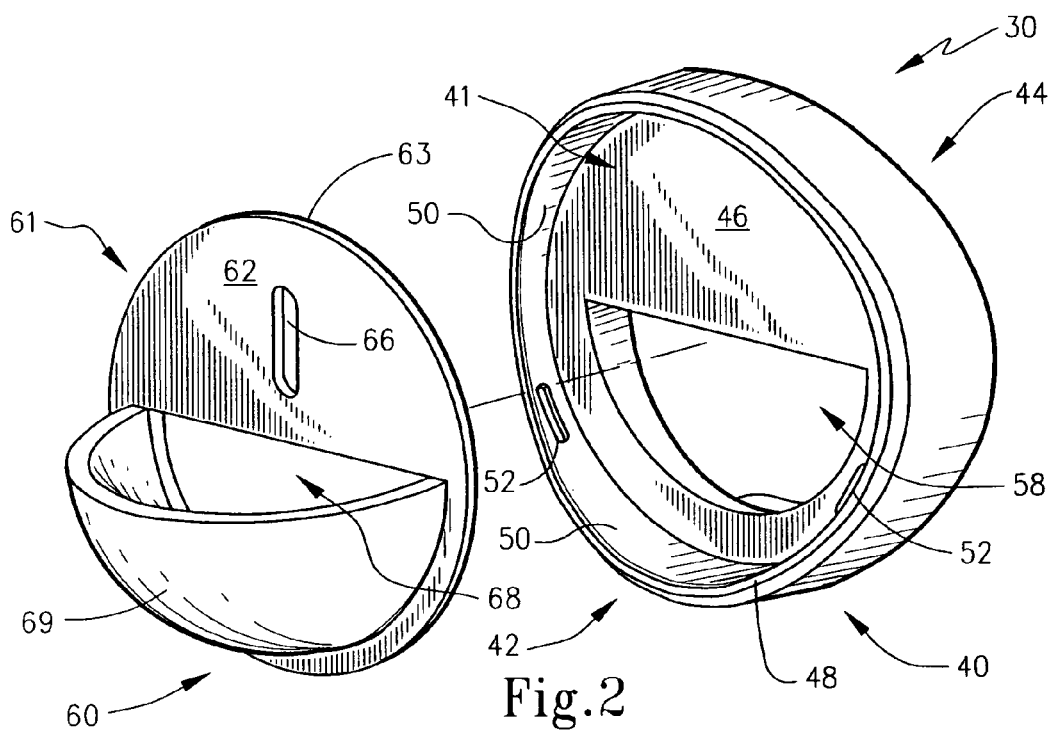
FIG. 2 is an exploded perspective view of a representative one of the seed dispensers shown in FIG. 1.

The present invention relates to seed dispensing birdfeeders for attracting wild birds. In particular, the present invention relates to a seed dispenser that may be used in conjunction with a birdfeeder so as to increase its versatility. More particularly, as contemplated, the seed dispenser of the present invention provides alternative seed apertures, each capable of dispensing different types of birdseed so as to attract a variety of species of birds.

Broadly, the seed dispenser of the present invention includes an apertured piece with multiple seed apertures, preferably of different configurations. The apertured piece may be coupled to the sidewall of the birdfeeder with a base piece so as to be moveable relative thereto. The base piece may be removably mounted to the sidewall of a birdfeeder such that it is partly disposed in the silo, and the apertured piece preferably includes a first seed aperture of a first configuration and a second seed aperture of a second configuration that is different from that of the first configuration.

The apertured piece may be in the form of an apertured dial that is rotatably disposed in the base piece. The apertured dial is moveable between a first orientation wherein a first seed aperture is oriented in a seed accessible state so as to provide access to the bird seed and a second orientation wherein a second seed aperture is in the seed accessible state. When the desired seed aperture is in the seed accessible state, the feeding bird may access the seed therethrough while the other aperture(s) on the piece are obstructed or blocked such that the birds are unable to access the seed therethrough. The seed dispenser of the present invention may alternatively include a retaining piece used to secure the dispenser to the feeder and to secure the dial thereon.

To better understand the construction of the seed dispenser of the present invention, and its ability to enhance the versatility of birdfeeders, reference is first made to FIG. 1, which shows a birdfeeder in the form of a tube feeder 10 in use with seed dispensers 30 and 31 according to the present invention. Generally, tube feeder 10 birdseed reservoir 12, lid 14, hanger member 16, and feeding stations 20. As shown, birdseed reservoir 12 has a cylindrical sidewall 111 and an interior and may be constructed from a clear plastic material, but may also be constructed of any suitable material as known in the art, such as metal, glass, and the like. Lid 14 further includes a hanger member 16, which is in the form of a chain that may be used to suspend the feeder from any appropriate support structure, such as a post, tree branch, porch ceiling, or other desired location for observing birds. Hanger member 16 may be of any suitable construction that enables tube feeder 10 to be elevated above the ground.

Feeding stations 20 include perches 18 located adjacent to a respective seed dispenser 30 and 31. Since seed dispensers 30 and 31 are identical in construction, seed dispenser 30 will be used as a representative sample to discuss the construction of the seed dispensers in more detail. Seed dispenser 30 may be removably disposed in designated locations along the length of the sidewall 11 of birdseed reservoir 12. More particularly, seed dispenser 30 is adapted to nest within holes cut out of the sidewall 11 of the birdseed reservoir. For example, the opening in sidewall 11, shown here as mounting hole 80 in FIG. 1, is cut directly out of the sidewall 11 of birdseed reservoir 12. As shown, mounting hole 80 further includes registration notch 82, which will be described below in further detail. Seed dispenser 30 may be either removably disposed in hole 80 or, alternatively, permanently fixed therein.

Although not shown, it may be desirable to reinforce the birdfeeder silo in an area proximate to the seed dispensing device 30 with metal such as copper, stainless steel, and the like. Metal reinforcement of the area surrounding seed dispensing device 30 assists in preventing squirrels from chewing the sidewall 11 of birdseed reservoir 12 in and around the feeding stations and gaining access to the seed.

Before describing the nested relationship between seed dispenser 30 and mounting hole 80 in further detail, it is perhaps first helpful to better understand the construction of the seed dispenser itself. Accordingly, with reference now to FIG. 2, seed dispenser 30 generally includes base piece 40 and an aperture piece, which is shown here to be in the form of apertured dial 60. Apertured piece is coupled to sidewall 11 by base piece 40. Both the base piece 40 and the apertured dial 60 may be made of plastic, wood, metal, a combination thereof or any other material suitable for the construction of a birdfeeder.

Base piece 40 is shown in FIGS. 2-6. As shown, base piece 40 is unitary in construction and has a front portion 42 and back portion 44, which are separated from one another by a partitioning wall 46. Front portion 42 includes sidewall 50, which extends outwardly from partitioning wall 46 to terminate in rim 48. Retaining tabs 52 are disposed on the interior surface of sidewall 50 in spaced relation to one another. While two retaining tabs 52 are shown, it should be appreciated that any number of retaining tabs may be disposed circumferentially about sidewall 50. Preferably, though, the number and placement of retaining tabs 52 is able to accomplish an engagement between base piece 40 and apertured dial 60 sufficient to retain apertured dial therein while allowing rotation of apertured dial 60 relative to the base piece 40.

Figures 6, 7:
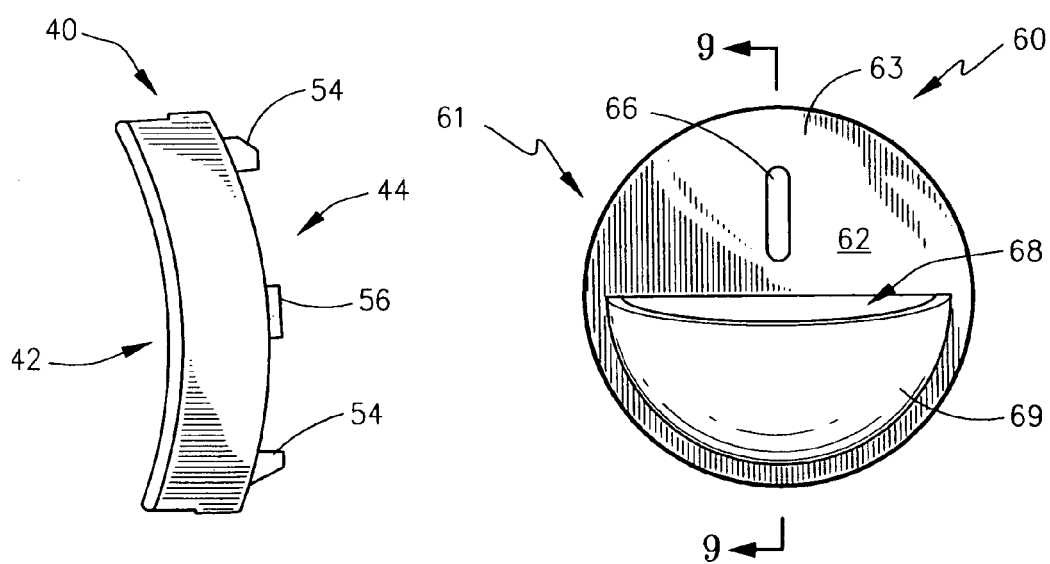
FIG. 6 is a right side view in elevation of the base piece of FIG. 3.
FIG. 7 is a front view in elevation of the apertured dial of the seed dispenser shown in FIG. 2.
Figure 8:
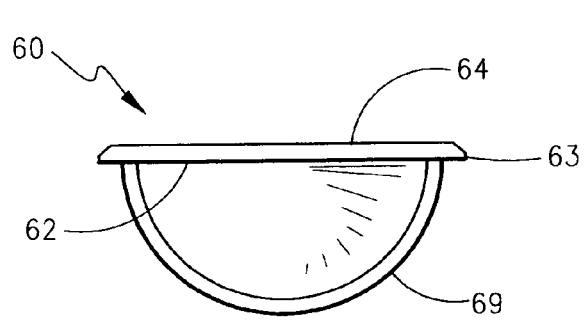
FIG. 8 is a top view in elevation of the apertured dial.
Figure 9:
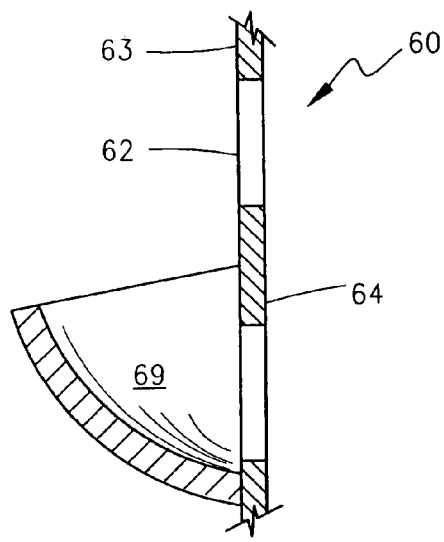
FIG. 9 is a cross-sectional view of the apertured dial shown in FIG. 7 taken about lines 9-9.

As shown in FIGS. 4-6, back portion 44 of base piece 40 includes resilient prongs 54 and registration finger 56. The backside of retaining tabs 52 is also shown. Prongs 54 are adapted to releasably secure base piece 40 on the sidewall 11 of birdseed reservoir 12 in mount hole 80 (shown in FIG. 1).

Figure 10A:
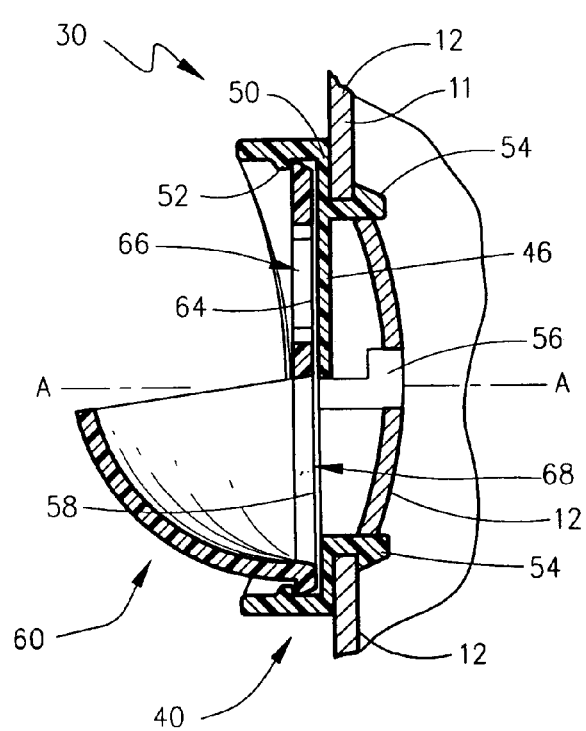
FIG. 10(a) is a cross-sectional view of a representative seed dispenser shown in FIG. 1 taken about lines 10(a)-10(a) with the second seed aperture in the seed access state.
Figure 10B:
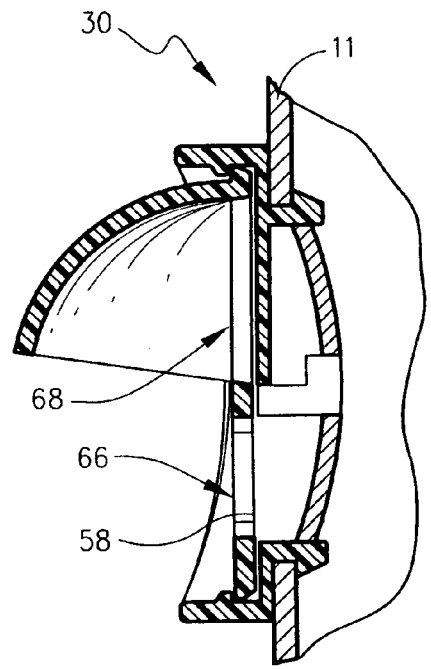
FIG. 10(b) is a cross-sectional view of the seed dispenser shown in FIG. 1 taken about lines 10(a)-10(a) with the first seed aperture in the seed access state.

Further, registration finger 56 is adapted to engage registration notch 82 shown in FIG. 1 to facilitate proper registration of base piece 40 within mount hole 80. These features are discussed in further detail below in reference to FIGS. 10(*a*) and 10(*b*).

Retaining tabs 52 and prongs 54 may be formed as an integral part of the base piece as a one-piece molding of plastic. Retaining tabs 52 and prongs 54 may be made of other materials, but are preferably resilient so as to allow the respective pieces to be fitted together as is contemplated by this exemplary embodiment of the present invention.

Partitioning wall 46, which partitions base piece 40 as shown in FIGS. 2-4 to include an opening in the form of seed outlet 58. Outlet port 58 is shown as a semi-circular opening that is approximately half the size of wall 46. As should be understood, outlet port 58 is not limited to the size and configuration shown, however, it is preferred that outlet port 58 be of a size and configuration that can dispense multiple types of birdseed.

Now that base piece 40 has been described in some detail, the features of apertured dial 60 may be discussed. First, as may be seen with reference to FIGS. 2 and 7-9, apertured dial 60 includes a disc-shaped wall 61 that has a front surface 62 and a back surface 64 defined by edge 63 and two seed apertures 66 and 68 formed therethrough. First seed aperture 66 is in the form of a thistle seed dispenser and second seed aperture 68 is in the form of a mixed seed dispenser and is surrounded by a forwardly projecting, cup-shaped trough 69. Mixed seed aperture 68 is primarily sized and adapted to dispense mixed seed or sunflower seeds, which may collect in trough 69 so as to be accessible by the feeding birds.

Having now discussed base piece 40 and apertured dial 60 independently, their interrelationship may now be described. As mentioned above, apertured dial 60 is adapted to be rotatably disposed in base piece 40. More particularly, and with reference to FIG. 2, apertured dial 60 may be pressed into place in interior 41 such that edge 63 clears retaining tabs 52 and back surface 64 confronts partitioning wall 46, thereby to accomplish a snap-fit engagement.

With reference now to FIG. 1 and FIG. 10(*a*), the interrelationships between base piece 40 to both apertured dial 60 and birdseed reservoir 12 may now be more fully appreciated. Opening 56 or mount hole, in sidewall 11 has a central axis "A" that is generally perpendicular to sidewall 12. Base piece 40 nests within mount hole 80 of birdseed reservoir 12 such that it is mounted to the sidewall 11 of birdseed reservoir 12 and partly disposed therein. Accordingly, registration post 56 is seated within registration notch 82 and prongs 54 anchor base piece 40 to the sidewall 11 of birdseed reservoir 12. Apertured dial 60 is disposed in base piece 40 and journaled for rotation on the central axis "A" and rotates relative thereto. Accordingly, back surface 64 is in confronting relationship with partitioning wall 46 of the base piece. Further, edge 63 has been pressed past retaining tabs 52 and is frictionally engaged with sidewall 50. Mixed seed aperture 68 is in the seed accessible state, and, as such, it is in fluid communication with outlet port 58. Thistle seed aperture 66 is obstructed from access to the birdseed in the birdfeeder by partitioning wall 46.

Apertured dial 60 may be rotated, if desired, to register thistle seed aperture 66 in the seed accessible state. With reference then to FIG. 10(*b*), thistle seed aperture 66 is now in fluid communication with outlet port 58. As such, mixed seed aperture 68 is now in the inactive state and partitioning wall 46 and thereby obstructed from access to the birdseed in the birdfeeder by partitioning wall 46.

An alternative seed dispenser, according to the present invention, is shown in FIGS. 11-18. Broadly, this alternative seed dispenser includes three pieces—a base piece, an alternating seed aperture piece, and a retaining piece. Since the alternating seed aperture piece has the same construction as that described above with reference to FIGS. 1-10, the following discussion will focus primarily upon the construction of the base piece, the retaining piece, and the interrelationship among the three pieces.

Figure 11:
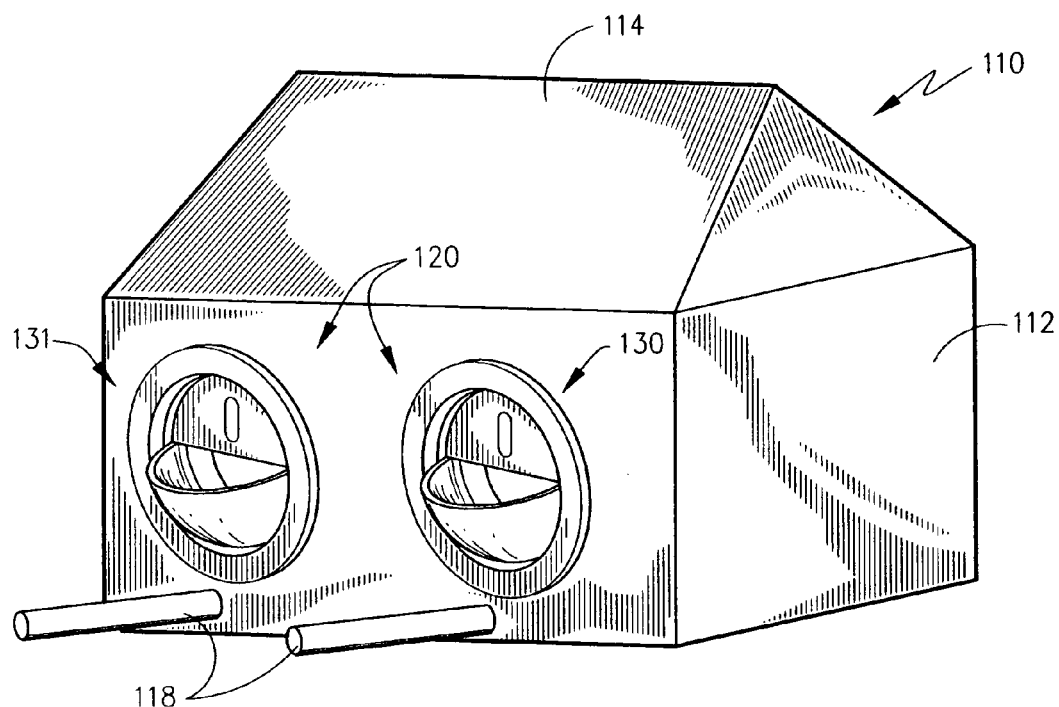
FIG. 11 is a perspective view of an alternative birdfeeder according to the present invention, which incorporates a plurality of seed dispensers according to a second exemplary embodiment of the present invention.
Figure 12:
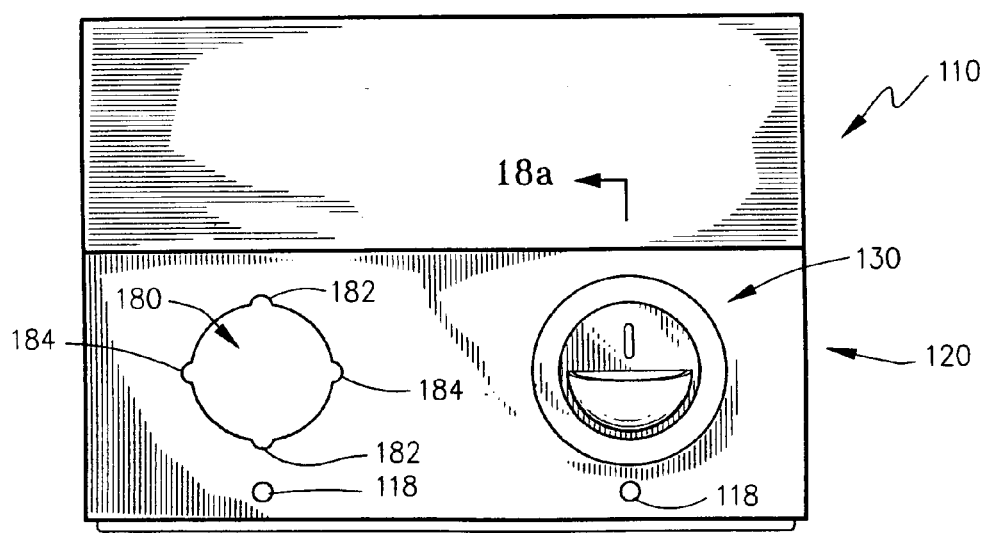
FIG. 12 is a front perspective view, in elevation, of a birdfeeder shown in FIG. 11.

Turning first to FIGS. 11 and 12, a birdfeeder in the form of hopper feeder 110 is shown to include birdseed reservoir 112, lid 114, and feeding stations 120, two of which are shown. Each feeding station 120 includes a perch 118 located adjacent a respective seed dispenser 130 and 131, which are adapted to be mounted to the sidewall 111 of birdseed reservoir 112, in fluid communication with the bird seed inside the birdseed reservoir via a mounting hole, such as mount hole 180, which may be cut out of the sidewall 111 of birdseed reservoir 112. Mount hole 180 includes first notches 182 and second notches 184, which will be described in further detail below.

Since seed dispensers 130 and 131 are identical, seed dispenser 130 will be used as a representative sample to discuss the construction of this exemplary embodiment of the present invention. Accordingly, with respect to FIG. 13, seed dispenser 130 generally includes base piece 140, an alternating seed aperture piece in the form of apertured dial 160, and a retaining piece in the form of retaining ring 190. Each of these three pieces may be made of metal, plastic, a composite thereof, or other material suitable as a seed dispenser for use with a birdfeeder.

Figure 13:
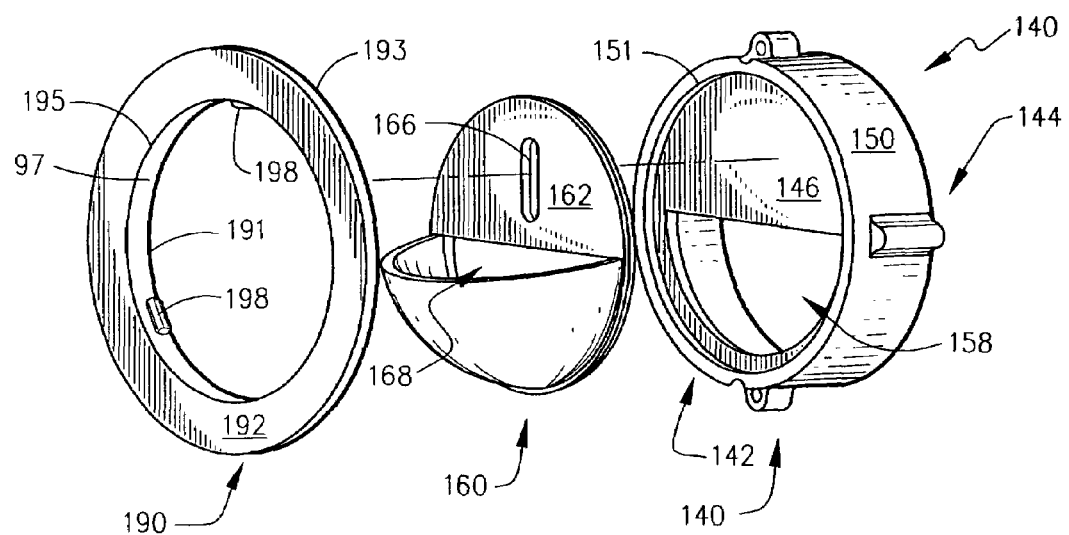
FIG. 13 is an exploded perspective view of one of the seed dispensers shown in FIGS. 11 and 12.
Figure 14:
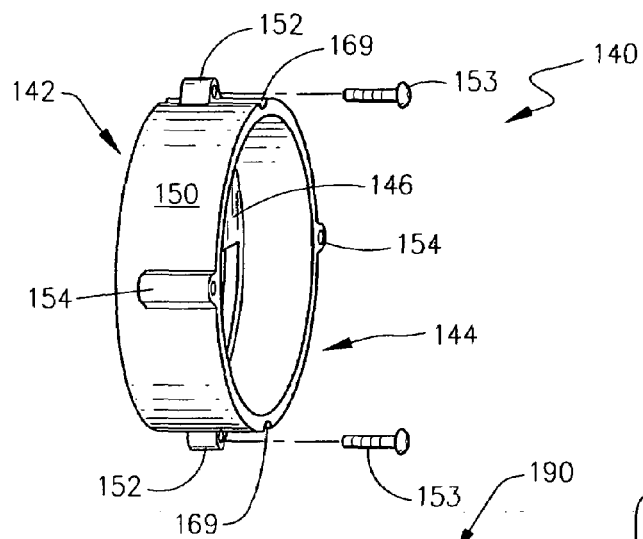
FIG. 14 is a rear perspective view of the base piece of the seed dispenser shown in FIGS. 11 and 12.
Figure 15:
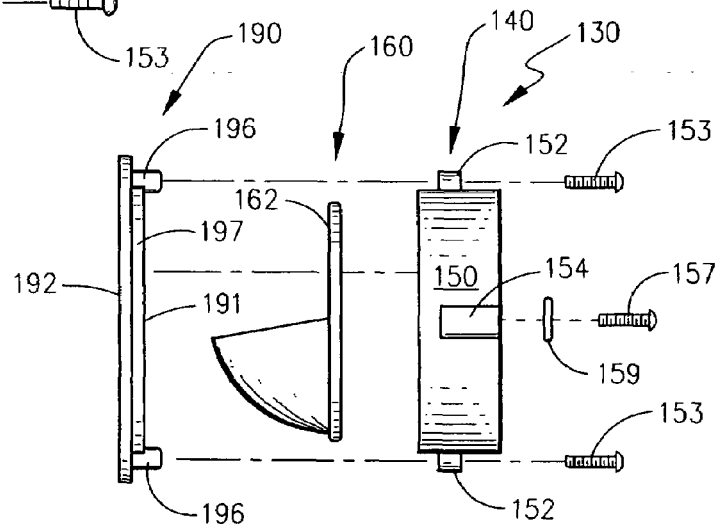
FIG. 15 is an exploded left side view, in elevation, of the seed dispenser shown in FIGS. 11 and 12.

Similar to seed dispenser 30 described above, base piece 140 mounts seed dispenser 130 to the sidewall 111 of the birdseed reservoir and apertured dial 160 is rotatably disposed therein to allow a desired seed aperture 166 or 168 to be in the seed accessible state. As shown in FIGS. 13-15, base piece 140 is an annular piece of unitary construction with a front portion 142 and a back portion 144 separated by a partitioning wall 146. Partitioning wall 146 includes outlet port 158, which, similar to the seed dispenser shown in FIGS. 1-10, is sized to dispense different types of birdseed. When a desired seed aperture 166 or 168 is registered to be in fluid communication with outlet port 158, feeding birds may access the selected seed within the birdseed reservoir.

With continued reference to FIGS. 13-15, base piece 140 has an outer surrounding sidewall 150 with an inner surface 151 located in front portion 142. Notably, inner surface 151 does not include retaining tabs disposed circumferentially thereabout to retain apertured dial 160 therein. Rather, as will be discussed in more detail below, retaining ring 190 is adapted to retain apertured dial 160 therein when the three pieces are assembled.

Base piece 140 is also shown to include a pair of first ears 152 and a pair of second ears 154 disposed about the outer surface of sidewall 150. As shown in FIG. 15, first ears 152 are adapted to allow screws 153 to pass therethrough so as to be received by stand offs 196 of retaining ring 190. Accordingly, retaining ring 190 may be releasably secured to base piece 140. As shown, grooves 169 may further be associated with first ears 152 to help alignment of the screws with the ears and to reduce any gaps or open spaces resulting from the coupling of the base piece and the retaining ring. Second ears 154, are adapted to receive a respective screw 157, which, in conjunction with a respective washer 159 releasably secure base piece 140 to the sidewall 111 of the birdseed reservoir. This will be discussed in more detail below with respect to FIGS. 18(*a*) and (*b*).

As should be appreciated by one skilled in the art, other forms of fasteners besides screws 153 may be used to couple the base piece and retaining ring. For example, fasteners such as nails, rivets, and the like can pass through first ears 152 to be secured into the retaining ring. It should also be appreciated that the location of first ears 152 and second ears 154 are not limited to the respective locations shown in the Figures. Further, additional first or second ears could be disposed about the surface of the outer sidewall for additional places of securement. Alternatively, first and second ears 152 and 154 may be formed in outer sidewall 150 of retaining ring 190 such that they do not project therefrom an such that the outer surface of sidewall 150 is generally uniform.

With continued reference to FIGS. 13 and 15, and with additional reference to FIGS. 16 and 17, retaining ring 190 is shown as an annulus of unitary construction having a front surface 192, a back surface 194, an outer edge 193, and an inner edge 195. As perhaps best shown in FIGS. 13 and 15, retaining ring 190 further includes a sidewall 197 extending from inner edge 195 outwardly from back surface 194 to terminate in rim 191.

As shown in FIGS. 13 and 16, three retaining tabs 198 are disposed about the inner surface of sidewall 197 in spaced relation to one another. As contemplated, when the seed dispenser is assembled, retaining tabs 198 confront the front surface 162 of apertured dial 160 so as to keep apertured dial 160 between retaining ring 190 and base piece 140. Although three retaining tabs 198 are shown, any number of retaining tabs may be disposed circumferentially about sidewall 197. Preferably though, the number, size, and placement of the tabs allows free rotation of the apertured dial but yet creates enough friction such that the apertured dial stays in place while in use. Alternatively, retaining tabs could be disposed on the front surface of apertured dial 160 instead of about sidewall 197 of the retaining ring. As contemplated, an appropriate number of retaining tabs could be disposed circumferentially about the front surface 162 of the apertured dial so as to confront portions of the rim 191 of the retaining ring.

Now that the individual components of the alternative seed dispenser shown in FIGS. 11-17 have been described in some detail, both its assembly and interrelationship with a birdfeeder may be more fully appreciated. Turning then to FIGS. 18(a) and 18(b), assembled seed dispenser 130 is shown mounted in opening 180, which has a central axis "A" that is generally perpendicular to sidewall 111. Base piece 140 and retaining ring 190 are releasably secured to one another by screws 153 and apertured dial 160 is rotatably disposed therebetween and relative to base piece 140 such that front surface 162 confronts rim 191 and retaining tabs 198. In FIG. 18(a), seed dispenser 130 is in the first seed access state wherein mixed seed aperture 168 is in fluid communication with outlet port 158. In FIG. 18(b), seed dispenser 130 is in the second seed access state wherein thistle seed aperture 166 is in fluid communication with outlet port 158.

As briefly mentioned above, seed dispenser 130 nests within a mount hole cut out of the sidewall 111 of the birdseed reservoir and is retained in position with fasteners in the form of screws. More specifically, base piece 140 nests within mount hole 180, which is shown in FIG. 12. Since first ears 152 and second ears 154 project from the outer sidewall 150 of base piece 140, mount hole 180 further includes first notches 182 and second notches 184, which correspond, respectively to first ears 152 and second ears 154 such that hole 180 nestably receives base piece 140.

Base piece 140 is releasably secured to the sidewall 111 of birdseed reservoir 112 by a fastener in the form of screw 157 and washer 159. More specifically, a respective screw 157 is received by a respective second ear 154 (shown in FIG. 14). Together, screw 157 and washer 159, anchor base piece 140 to the sidewall 111 of birdseed reservoir 112 thereby to releasably fasten the seed dispenser thereto.

Figure 19:
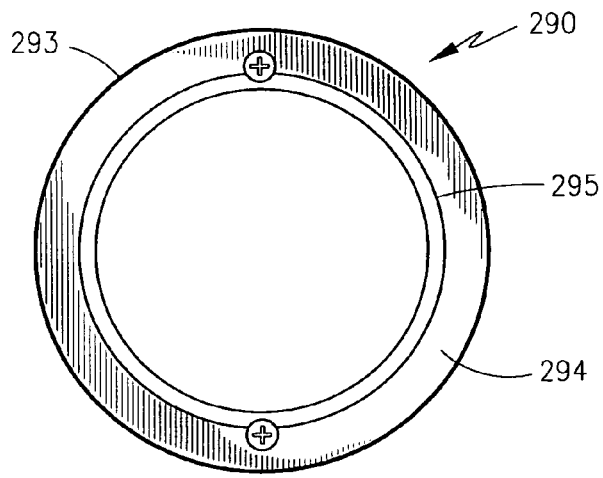
FIG. 19 is a rear view in elevation of an alternative retaining ring.
Figure 20:
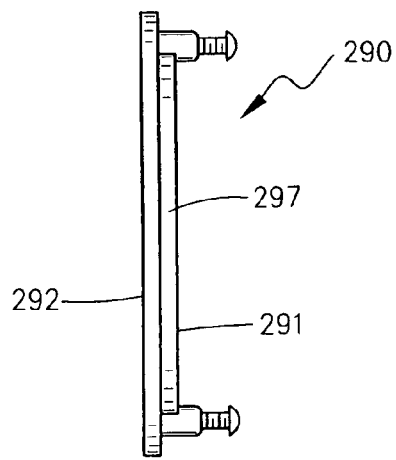
FIG. 20 is a right side view in elevation of the alternative retaining ring shown in FIG. 19.
Figure 21:
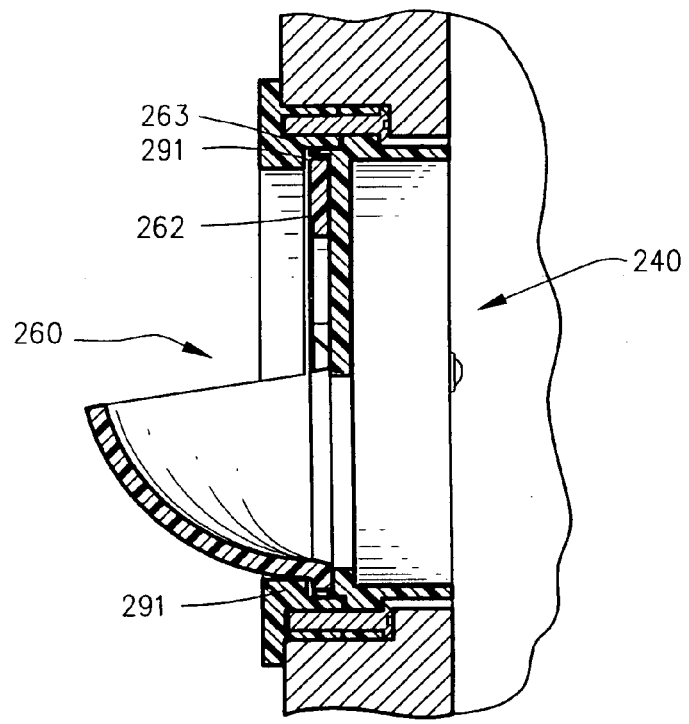
FIG. 21 is a cross-sectional view of the seed dispenser shown in FIGS. 11 and 12 in use with the alternative retaining ring shown in FIGS. 19 and 20.

Turning now to FIGS. 19 and 20 an alternative retaining ring 290 is shown which is also an annulus of unitary construction having a front surface 292, back surface 294, an outer edge 293, and an inner edge 295. Retaining ring 290 further includes a sidewall 297 extending from inner edge 295 outwardly from back surface 294 to terminate in rim 291. As compared to retaining ring 190 shown above in FIGS. 13, 15-18(a) and (b), retaining ring 290 in FIGS. 19 and 20 does not include separate, angularly spaced retaining tabs to hold the apertured dial in place. Rather, sidewall 297 includes a radially inwardly projecting rim 291 extending around the inner perimeter of sidewall 297 that is wide enough to confront the front surface 262 of apertured dial 260. This confronting relationship is shown in FIG. 21. As may be seen, rim 291 confronts front surface 262 proximately to edge 263 of apertured dial 260. Accordingly, rim 291 keeps apertured dial 260 between retaining ring 290 and base piece 240.

Figure 22:
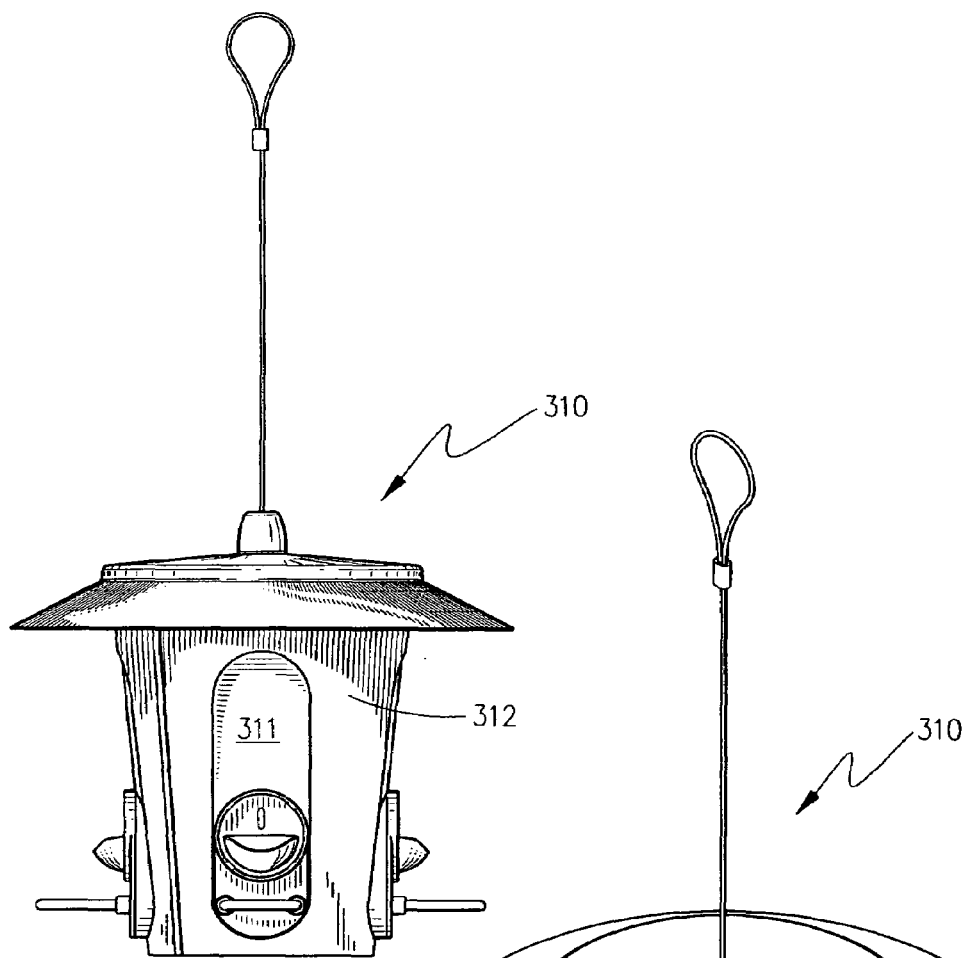
FIG. 22 is a front view in elevation of another birdfeeder according to the present invention, which incorporates a plurality of seed dispensers according to a third exemplary embodiment of the present invention.
Figure 23:
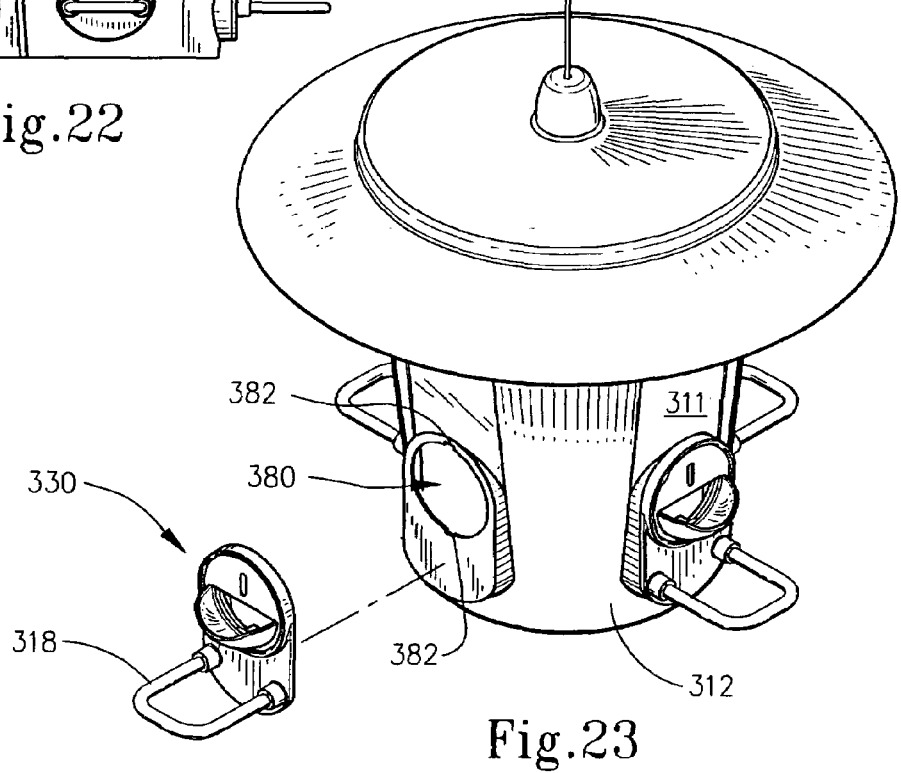
FIG. 23 is a partial exploded view of the birdfeeder shown in FIG. 22 with a representative one of the seed dispensers removed from its mounting hole.

Another seed dispenser according to the present invention is shown in FIGS. 22-27. This seed dispenser includes two pieces—the base piece and the apertured piece. Turning first to FIGS. 22 and 23, a birdfeeder 310, of generally of frustoconical configuration, is shown to include birdseed reservoir 312 having a sidewall 311 and a plurality of seed dispensers 330. Each seed dispenser 330 is adapted to be mounted to mounting hole, such as hole 380, which is in fluid communication with the birdseed inside the birdseed reservoir and adapted to provide access thereto. As shown mount hole 380 includes two notches 382, which will be described in further detail below.

With reference to FIGS. 24, a representative seed dispenser 330 is shown to including base piece 340 and apertured dial 360. Base piece 340 has a different configuration than heretofore described in that it is adapted to confront the sidewall 311 of the birdfeeder shown in FIGS. 22 and 23. Base piece 340 is more elongated than compared to that shown FIGS. 3 and 4 above and further includes perch 318, which is releasably securable to standoffs 356 such as by a snap fit engagement.

With reference to FIGS. 24-27, base piece 340 includes back wall 346, which extends the length thereof. Back wall 346 further includes an opening in the form of seed outlet 358. When base piece 340 is mounted to the sidewall of the birdseed reservoir, seed outlet 358 is in fluid communication with the mounting hole permitting access to the birdseed contained therein.

Base piece 340 is shown further to include four retaining tabs 352 in spaced relation to one another. Similar to the retaining tabs described above with reference to FIGS. 2-6, retaining tabs 352 are adapted to accomplish an engagement between base piece 340 and apertured dial 360 sufficient to retain apertured dial therein while allowing rotation of apertured dial 360 relative to the base piece 340.

Base piece 340 further includes a pair of prongs 354. Again, similar to that described above with respect to FIGS. 4-6, prongs 354 are adapted to releasably secure base piece 340 to the sidewall 311 of birdseed reservoir 312 in mount hole 380 shown in FIG. 23. With reference to FIG. 23, the attachment of base piece 340 is similar to that described above with reference to FIGS. 10(a) and 10(b) in that prongs 340 pass through notches 382 to anchor base piece 340 to the sidewall 311 of birdseed reservoir 312. Preferably, prongs 354 are formed of a resilient material to facilitate the removal and reattachment of base piece 340 to sidewall 311.

With continued reference to FIGS. 24-26, apertured dial 360 is similar in construction to both the apertured dials described above with reference to FIGS. 2 and 13. As such, it is rotatably disposed in the base piece 340. Accordingly, when mixed seed aperture 368 is in the seed accessible state, it is in fluid communication with outlet port 358 and thistle seed aperture 366 is obstructed from access to the birdseed by back wall 346. Similarly, when thistle seed aperture 366 is in the seed accessible state, it is in fluid communication with outlet port 358 while mixed seed aperture 368 is obstructed from access to the birdseed in the birdfeeder by back wall 346.

An alternative birdfeeder and seed dispenser, both according to the present invention, are shown in FIGS. 28-37. Turning first to FIG. 28, tube birdfeeder 410 is shown to include a plurality of seed dispensers 430, 431, and 433, birdseed reservoir 412, lid 414, hanger member 416, and tray 417. Since seed dispensers 430, 431, and 433 are identical in construction, seed dispenser 430 will be used as a representative sample to discuss the construction thereof in more detail.

Turning now to FIGS. 29 and 30, seed dispenser 430 generally includes base piece 440, apertured piece 460, spacer 470, and end piece 490. Together, base piece 440 and end piece 490 form a base assembly that houses both apertured piece 460 and spacer 470. More particularly, as shown in FIGS. 31-33, base piece 442 and end piece 490 form base assembly 440, which defines chamber 450 for receiving both the apertured piece and the spacer therein.

Taken separately, base piece 442 includes perch 418, front plate 444 having opening 446 formed therein and resilient prongs 453 and 454, which are operative to releasably secure the seed dispenser, when assembled, to the sidewall of the birdseed reservoir in openings such as opening 480 shown in FIG. 28. Projecting away from front plate 444 is flange 448, which includes a plurality of spaced apart tab members 456. Base piece 442 further includes lip 449 such that when assembled, apertured piece 460 abuts lip 449 so as to be retained in chamber 450.

End piece 490 is shown here in the form of a disc and generally includes end wall 492, access opening 494, and a plurality of spaced apart tab slots 496. Tab slots 496 are sized and adapted to receive tab members 456 of base piece 442 in a nested relationship thereby permitting the two pieces to be coupled together by, for example, snap-fit engagement, press-fit engagement, ultrasonic welding, adhesives, or other suitable means. Once coupled, flange 448 supports end wall 492 and tab members 456 extend slightly beyond wall 492. Tab members 456 may thereafter be peened over to fixedly attach end piece thereto and secure to ensure a tight fit engagement between the two pieces. Alternatively, if desired, base piece 442 and end piece 490 may be releasably secured to one another. When assembled, base assembly 440 defines chamber 450 and opening 446 and access opening 494 are aligned so as to be in fluid communication with one another.

As mentioned above, both apertured piece 460 and spacer 470 are both disposed in the chamber of the base assembly, proximate to the end piece, when the seed dispenser is assembled. Apertured piece 460 is identical in construction as that discussed above with reference, for example, to FIGS. 1-10 and thus is rotatably disposed in the chamber. Spacer 470 separates apertured piece 460 from end wall 492 to facilitate its movement that permits the selective positioning of the desired seed port in the seed accessible state.

Figure 35:
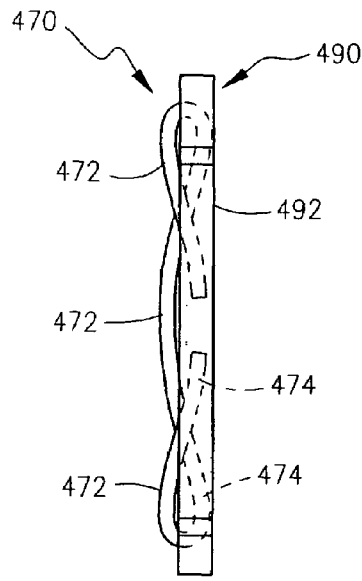
FIG. 35 is a cross-sectional view of the spacer and end piece showing the spacer retained by the groove formed in the end piece.
Figure 36:
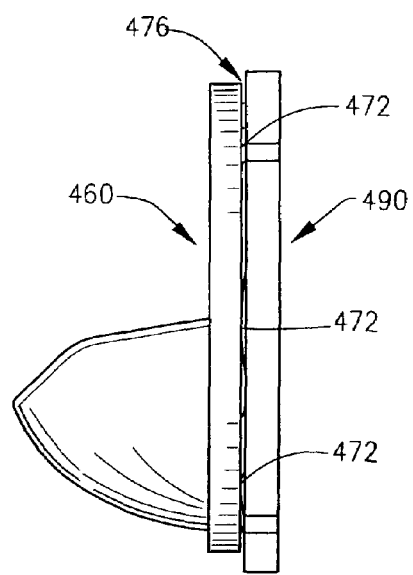
FIG. 36 is a side view in elevation of the apertured piece, the end piece and the spacer interposed therebetween.

As shown in FIGS. 29 and 30, spacer 470 is in the form of an undulating wire ring that is shaped similar to that of a spring and is interposed between apertured piece 460 and end piece 490 when the seed dispenser is assembled. Wire ring 470 is retained in place between apertured piece 460 and end piece 490 by circumferential groove 498 formed in end piece 490 as shown in FIGS. 33-35. When received in groove 498, some undulations 472 are not flush with end wall 492 while other undulations 474 are nestably received in groove 498. As such, the extending undulations 472 achieve the desired spacing between end piece 490 and apertured piece 460, while undulations 474 retain wire spring 470 in place during movement of apertured piece 460. As shown in FIG. 36, apertured piece 460 is separated from end piece 490 by space 476, created by undulations 472. Wire ring 470 may be formed of steel or other suitable material that accomplishes forming space 476.

Figures 37A, 37B:
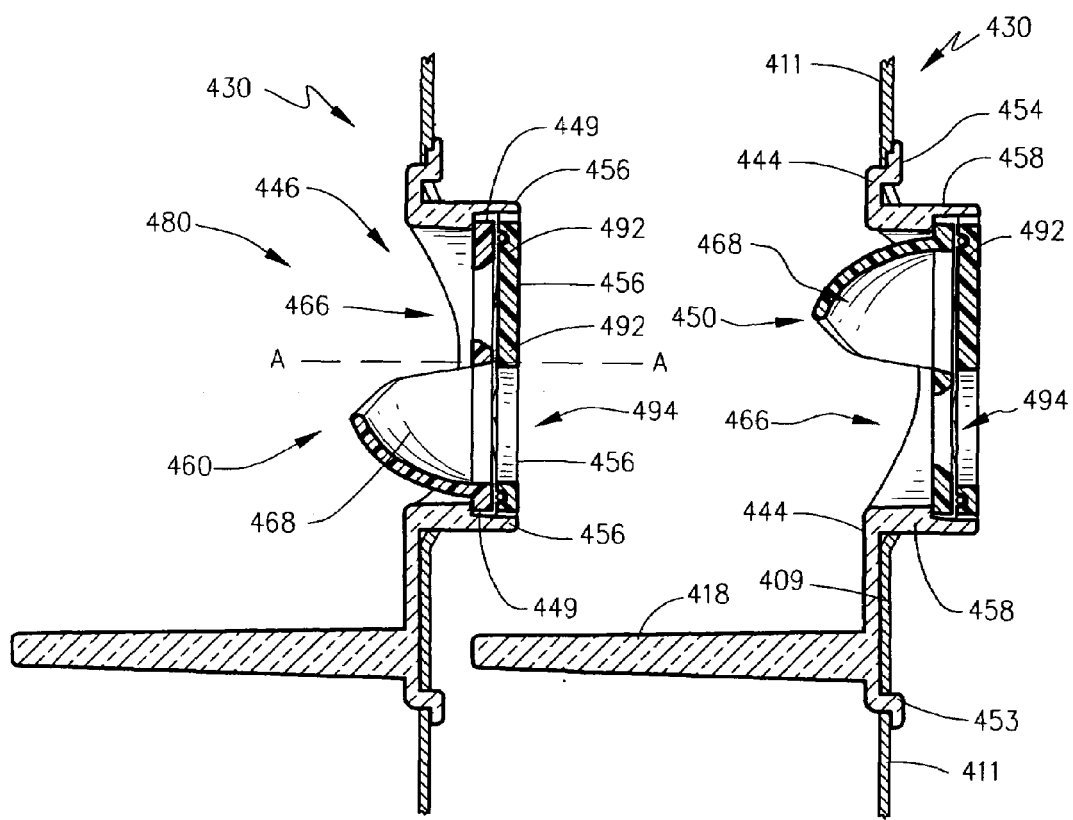
FIG. 37(a) is a cross-sectional view of a representative seed dispenser shown in FIG. 28 taken about lines 37-37 with the mixed seed aperture in the seed accessible state.
FIG. 37(b) is a cross-sectional view of a representative seed dispenser shown in FIG. 28 taken about lines 37-37 with the thistle seed aperture in the seed accessible state.

Now that the construction of components of seed dispenser 430 have been described, it may further be appreciated that seed dispenser 430 may be removably disposed, or if desired, permanently fixed in designated locations along the length of the cylindrical sidewall 411 of birdseed reservoir 412. Openings, such as opening 480 shown in FIG. 28, may be formed in sidewall 411 of birdseed reservoir 412 and may further include notch 482 for receiving a prong of the base piece. With reference then to FIGS. 28, 37a, and 37b, opening 480 has a central axis "A" that is generally perpendicular to sidewall 411. Base piece 442 nests within an opening, such as opening 480, such that prong 454 is received by notch 482 and both prongs 453 and 454 anchor base piece to sidewall 411.

Front plate 444 confronts outer surface 409 of birdseed reservoir sidewall 411 and surrounds the opening formed in the sidewall. Front plate 444 essentially acts as a shield about the opening in the birdseed reservoir in effort to prevent squirrels and other animals from chewing through the sidewall to gain access to the birdseed. Opening 446 in front plate 444 is in fluid communication with the opening 480. Flange 458 extends around opening 480 in sidewall 411 and projects away from front plate 444 and into the reservoir. Tab members 456 extend beyond wall 492 and apertured piece 460 abuts lip 449 of base piece 442 so as to be retained within chamber 450.

Apertured piece 460 is journaled for rotation on axis "A" and rotates relative thereto. As shown in FIG. 37(a), mixed seed aperture 468 is in the seed accessible state, and as such, is in fluid communication with access opening 494. Thistle seed aperture 466 is obstructed from access to the birdseed by end wall 492. In FIG. 37(b), apertured piece 460 has been rotated to now register thistle seed aperture 466 in the seed accessible state. As shown, thistle seed aperture 466 is in fluid communication with access opening 494 and mixed seed aperture 468 is now in the inactive state and end wall 492 obstructs access to the birdseed.

As shown, perch 418, front plate 444, prongs 453, 454, flange 448 may be formed as one integral piece. Base piece 442, apertured piece 460, and end piece 490 and may be formed of plastic, metal, wood, a combination thereof, or other suitable material for use in connection with a birdfeeder. Further, as should be appreciated, seed dispenser 430, as shown and described in reference to FIGS. 28-37, may be incorporated on a variety of birdfeeders, such as the feeders shown in FIG. 11 and FIG. 22.

Accordingly, the present invention has been described in great detail with reference to FIGS. 1-37. It should be appreciated from the foregoing that variations of the constructions described may be made by the ordinarily skilled artisan in this field without departing from the inventive concepts herein. For example, the individual pieces that make up the alternative seed dispensers are not limited to any particular size or dimension. Rather, the configuration of these pieces are primarily dictated by the sidewall of the birdseed reservoir that incorporates the seed dispenser. Also, the seed dispenser may employ alternative means by which the seed ports are alternated between the various seed access states. For example, an alternating seed aperture piece that moves horizontally or vertically within the base piece is contemplated whereby the horizontal or vertical movement shifts the seed aperture piece among the seed access states.

Also, as should be appreciated, the present invention further contemplates a method of utilizing a birdfeeder having a birdseed reservoir with a surrounding sidewall adapted to contain the birdseed and an opening formed in the sidewall adapted to access and dispense the birdseed to the birds. The method comprises the steps of providing the birdfeeder with a seed dispenser having a plurality of seed apertures associated therewith and adding a selected type of birdseed to the birdseed reservoir. The method also includes moving one of the seed apertures into a seed accessible state whereby the selected seed aperture is in fluid communication with the opening in the sidewall to permit access to the birdseed and allow for the birdseed to be dispensed therethrough. The method may also include the use of a rotatable dial piece having a plurality of seed apertures formed therethrough whereby the dial piece is rotated to move a selected seed aperture into the seed accessible state.

The method further includes rotating or otherwise moving a piece of the seed dispenser so as to place a desired seed port in the seed accessible state thereby to permit feeding birds access to the birdseed in the birdseed reservoir. It should be appreciated that the methodology of the present invention can include any steps, not limited to those discussed hereinabove, that can be accomplished by the above-described structures.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A dispenser adapted to access and dispense birdseed from a birdfeeder that has a birdseed reservoir with a sidewall having an outer surface and an inner surface, comprising:
   (A) a base assembly mounted to an opening in the sidewall of said reservoir, said base assembly including
      (1) a front plate having an opening formed therein;
      (2) a flange extending around the opening and projecting away from said front plate; and
      (3) an end wall supported by said flange such that said flange and said end wall together define a chamber, said end wall having an access opening formed therethrough; and
   (B) an apertured piece received in said chamber and including
      (1) a first seed aperture of a first configuration; and
      (2) a second seed aperture of a second configuration that is different from that of the first configuration; and
   (3) wherein said apertured piece is moveable relative to said base piece between
      (a) a first orientation wherein said first seed aperture is oriented in a seed accessible state so as to provide access to the bird seed; and
      (b) a second orientation wherein said second seed aperture is in the seed accessible state.

2. A dispenser according to claim 1 wherein said base assembly includes a plurality of resilient prongs operative to releasably secure said base assembly to said sidewall.

3. A dispenser according to claim 1 wherein said base assembly includes a perch.

4. A dispenser according to claim 1 wherein said front plate confronts the outer surface of the birdseed reservoir sidewall and surrounds the opening formed therein.

5. A dispenser according to claim 1 wherein the access opening is in fluid communication with the first seed aperture when said apertured piece is in the first orientation and wherein access to the birdseed via the second seed aperture is obstructed by said end wall.

6. A dispenser according to claim 1 wherein the access opening is in fluid communication with the second seed aperture when said apertured piece is in the second orientation and wherein access to the birdseed via the first seed aperture is obstructed by said end wall.

7. A dispenser according to claim 1 wherein the first configuration is adapted to dispense thistle birdseed from the reservoir.

8. A dispenser according to claim 1 wherein the second configuration is adapted to dispense mixed birdseed from the reservoir.

9. A dispenser according to claim 1 wherein said apertured piece is a dial that is rotatably disposed in the chamber.

10. A dispenser according to claim 1 including a spacer interposed between said end wall and said apertured piece and adapted to separate at least a portion of said apertured piece from said end wall.

11. A dispenser according to claim 10 wherein said spacer is an undulating wire.

12. A dispenser according to claim 11 wherein said end wall has a groove formed therein that is sized and adapted to receive at least a portion of said wire so as to retain said wire in place.

13. A dispenser adapted to access and dispense birdseed from a birdfeeder that has a birdseed reservoir with a sidewall having an outer surface and an inner surface, comprising:
   (A) a base piece mounted to an opening in the sidewall of said reservoir;
   (B) an end piece coupled to said base piece and including a wall having an access opening formed therethrough that is in fluid communication with the opening;
   (C) an apertured piece supported by said base piece at a location proximate to said wall of said end piece and including
      (1) a first seed aperture of a first configuration; and
      (2) a second seed aperture of a second configuration that is different from that of the first configuration; and
      (3) wherein said apertured piece is moveable relative to said base piece between
         (a) a first orientation wherein said first seed aperture is in fluid communication with the access opening; and
         (b) a second orientation wherein said second seed aperture is in fluid communication with the access opening; and (D) a spacer interposed between said end piece and said apertured piece.

14. A dispenser according to claim 13 wherein said base piece includes a flange extending around the opening and projecting into the birdseed reservoir.

15. A dispenser according to claim 14 wherein said flange includes a plurality of spaced apart tab members.

16. A dispenser according to claim 15 wherein said end piece includes a plurality of spaced apart tab slots adapted to receive said tab members in a snap-fit engagement.

17. A dispenser according to claim 13 wherein said base piece includes a prong operative to mount said base piece to said sidewall of the birdseed reservoir.

18. A dispenser according to claim 13 wherein said base piece includes a front plate formed as an integral part thereof that is adapted to surround the opening and confront the outer surface of said birdseed reservoir sidewall.

19. A dispenser according to claim 13 wherein
    (A) the first configuration is adapted to dispense thistle birdseed from the reservoir; and
    (B) the second configuration is adapted to dispense mixed birdseed from the reservoir.

20. A dispenser according to claim 13 wherein said base piece and said end piece together form a chamber sized and adapted to receive said apertured piece therein.

21. A dispenser according to claim 13 wherein said apertured piece is a dial that is rotatabably disposed in the chamber.

22. A dispenser according to claim 13 wherein said wall of said end piece has a groove formed therein that is sized and adapted to receive a portion of said spacer thereby to restrain movement thereof.

23. A dispenser according to claim 13 wherein said spacer is an undulating wire.

24. A birdfeeder adapted to be supported in spaced relation to a support surface and to provide birdseed to birds, comprising:
    (A) a birdseed reservoir with a surrounding sidewall adapted to receive the birdseed therein, said sidewall having an opening formed therethrough; and
    (B) a seed dispenser mounted to the opening in said sidewall and adapted to dispense the birdseed to the birds and including
        (1) a base assembly mounted to an opening in the sidewall of said reservoir, said base assembly including
            (a) a front plate having an opening formed therein;
            (b) a flange extending around the opening and projecting away from said front plate; and
            (c) an end wall supported by said flange such that said flange and said end wall together define a chamber, said end wall having an access opening formed therethrough; and
        (2) an apertured piece received in said chamber and including
            (a) a first seed aperture of a first configuration; and
            (b) a second seed aperture of a second configuration that is different from that of the first configuration; and
            (c) wherein said apertured piece is moveable relative to said base piece between
                (i) a first orientation wherein said first seed aperture is oriented in a seed accessible state so as to provide access to the bird seed; and
                (ii) a second orientation wherein said second seed aperture is in the seed accessible state.

25. A birdfeeder according to claim 24 wherein said end wall is fixedly attached to said flange in a snap-fit engagement.

26. A birdfeeder according to claim 24 wherein said base assembly includes a plurality of resilient prongs operative to releasably secure said base assembly to said sidewall.

27. A birdfeeder according to claim 24 wherein said front plate confronts the outer surface of the birdseed reservoir sidewall and surrounds the opening formed therein.

28. A birdfeeder according to claim 24 wherein said apertured piece is a dial that is rotatably disposed in the chamber.

29. A birdfeeder according to claim 24 wherein the access opening is in fluid communication with the first seed aperture when said apertured piece is in the first orientation and wherein access to the birdseed via the second seed aperture is obstructed by said end wall.

30. A birdfeeder according to claim 24 wherein the access opening is in fluid communication with the second seed aperture when said apertured piece is in the second orientation and wherein access to the birdseed via the first seed aperture is obstructed by said end wall.

31. A birdfeeder according to claim 24 wherein the first configuration is adapted to dispense thistle birdseed from the reservoir.

32. A birdfeeder dispenser according to claim 24 wherein the second configuration is adapted to dispense mixed birdseed from the reservoir.

33. A birdfeeder according to claim 24 including a spacer interposed between said end wall and said apertured piece and adapted to separate at least a portion of said apertured piece from said end wall.

34. A birdfeeder according to claim 33 wherein said spacer is an undulating wire.

35. A birdfeeder according to claim 24 including a plurality of openings formed in said sidewall of said birdseed reservoir and including a plurality of seed dispensers mounted thereto.

* * * * *